United States Patent Office 3,488,179
Patented Jan. 6, 1970

3,488,179
PROCESS FOR IMPROVING THE ASSIMILATION OF PHOSPHORUS BY PLANTS
Antonio Salvemini, Milan, Paolo Sequi, Cinisello, Milan, and Augusto Marchesini, Luigi Benedetti, and Gian Antonio Lanzani, Milan, Italy, assignors to Montecatini-Edison S.p.A., Milan, Italy
No Drawing. Filed June 6, 1966, Ser. No. 555,235
Claims priority, application Italy, June 7, 1965, 12,635/65; Apr. 4, 1966, 7,548/66
Int. Cl. C05b 7/00
U.S. Cl. 71—1                              6 Claims

ABSTRACT OF THE DISCLOSURE

The assimilation of phosphorus from solids by plants is improved by treating soil, containing the phosphorus in the form of soluble phosphates, with tartronic acid or a 2-lower alkyl tartronic acid, such as methyl tartronic acid. The tartronic acid or 2-lower alkyl tartronic acid may be supplied simultaneously with the fertilizer or subsequently thereto.

---

The present invention relates to a process for improving the assimilation of phosphorus by plants.

It is known in the art that only a small percentage of the phosphorus which is introduced to the soil via fertilizers is actually assimilated by plants, inasmuch as the iron, aluminium and calcium ions already present in the soil render the soluble phosphates insoluble.

A greater exploitation by plants of phosphorus introduced to the soil is advantageous, not only from an economic point of view, but also because it permits of the realization of better crops, both from the point of view of quality, as well as the increased quantity harvested.

According to the present invention, it has been found that the assimilation of phosphorus by plants is improved by adding to the surrounding soil an additive comprising tartronic acid or a 2-lower alkyl tartronic acid selected from the group consisting of methyltartronic acid, ethyltartronic acid, propyl and isopropyl tartronic acids, butyl, isobutyl and ter-butyl tartronic acids and derivatives thereof substituted in the alkyl moiety with one or more carboxyl, hydroxyl, amino radicals and amino radicals substituted with lower alkyl groups, and particularly with methyl and/or ethyl groups. These derivatives may be characterized as 2-lower alkyl tartronic acid substituted in the alkyl moiety with a substituent selected from the group consisting of carboxyl, hydroxyl, amino, lower alkyl amino, and di-lower alkyl amino. Such additives may be used singly or in admixture with each other.

Of the foregoing group of additives, methyl tartronic acid and tartronic acid are the preferred.

The additive may be supplied to the soil either together with the phosphorus containing fertilizer, or in one or more fertilizing runs after manuring, whereby the phosphorus is made available during periods of greatest usefulness for the crops. Thus the soil may be treated with the additive simultaneously with impregnating the soil with the phosphorus containing fertilizer or the soil may be treated with the additive subsequent to impregnating the soil with the phosphorus containing fertilizer.

The quantities employed may be varied within very wide limits. Good results are obtained both with very low quantities, for example, four quintals of additive per metric ton of phosphorus (expressed as $P_2O_5$), and large quantities, for example, 200 metric tons of additive per metric ton of phosphorus (expressed as $P_2O_5$), or even with medium quantities.

The quantities preferably used are comprised between four quintals and four metric tons of additive per metric ton of phosphorus (expressed as $P_2O_5$).

Depending on the quantities of additive used, it is possible not only to hinder the precipitation of the greatest part if not all of the phosphorus, but with quantities in the order of, for example, 2 metric tons of complexing additives per each metric ton of phosphorus (expressed as $P_2O_5$), even part of the phosphorus contained in the soil itself can be rendered soluble.

The additives of this invention may be incorporated into any type of phosphorus containing fertilizer. In the case of a granular fertilizer, for example, the solid additive may be admixed with the fertilizing ingredients during the granulation stage. In the case of liquid fertilizer, the additive may be added to the fertilizer in the form of a concentrated solution.

Another advantage afforded by the use of these additives is in the fact that these additives are not attacked by microorganisms, and thereby maintain their activity undiminished in the soil with time.

To further illustrate the present invention, as well as the advantages thereof, the following specific examples are given, it being understood that these are merely intended to be illustrative and not limitative.

EXAMPLE 1

For the tests described hereinafter, use was made of an apparatus consisting of a vessel with a porous bottom containing the soil under examination, this vessel being suitably connected with a container placed underneath, which contains an aqueous solution of methyl tartronic acid and a solution of $NaH_2PO_4$.

By means of slightly diminished pressure obtained via a suction pump, the liquid from the lower chamber rises through suitable ducts, rains down on the soil contained in the upper chamber soaking it and then percolating therethrough, and then returning to the lower chamber from whence it is recycled.

Seven apparatus of the type described above were connected to a suction pump. In the upper chamber of each apparatus were placed 50 g. of soil, the chemical, physical-mechanical analytical data of which were the following:

| | |
|---|---|
| pH | 5.5 |
| Organic substance ‰ (bichromate) | 33.6 |
| N ‰ (Kjeldahl) | 1.9 |
| Total $P_2O_5$ ‰ | 1.2 |
| $P_2O_5$ soluble in $H_2CO_3$ mg./kg. | 1.4 |
| Total $K_2O$ ‰ | 0.8 |
| Carbonates ‰ | Absent |
| Sand ‰ | 860 |
| Slime ‰ | 95 |
| Clay ‰ | 45 |

The symbol ‰ as used throughout the specification means that the values are expressed in terms of parts per thousand rather than per hundred. (Concise Chemical and Technical Dictionary, 2nd edition (1962), p. 1004.)

Into the lower chamber of the first apparatus, the data of which serving as comparative data, there was introduced 200 ml. of distilled water and 10 ml. of a solution of $NaH_2PO_4$, equivalent to 20 mg. of phosphorus.

Into the lower chambers of the second through seventh of the above mentioned apparatus there was introduced 200 ml. of an aqueous solution of methyl tartronic acid in concentration of 0.1 ‰, 0.2 ‰, 0.3 ‰, 0.5 ‰, 5 ‰ and 50 ‰ respectively, as well as 10 ml. of the same solution of $NaH_2PO_4$. These quantities correspond to, respectively, 4, 8, 12 and 20 quintals, 20 and 200 metric tons of methyl tartronic acid per metric ton of $P_2O_5$.

The test was conducted for 120 hours consecutively. Every 24 hours the circulation of the liquids was interrupted, and from the lower chamber of each apparatus a suitable liquid sample was withdrawn, the $PO_4^{---}$ ion content of which sample being established by current analytical methods.

The results of these tests are schematically recorded in the following table, wherein the P content (expressed in $\gamma$, that is, in micrograms i.e. $10^{-6}$ gram (Textbook of Quantitative Inorganic Analysis, 3rd edition (1952), Kolthoff and Sardell, p. 211)) of the cycled liquid is recorded as a function of time.

TABLE 1

| | 24 hours | 48 hours | 72 hours | 96 hours | 120 hours |
|---|---|---|---|---|---|
| Concentration used: | | | | | |
| 0 Blank | 382 | 190 | 100 | | 100 |
| 0.1°/°° | 350 | 350 | 310 | 290 | 298 |
| 0.2°/°° | 1,360 | 1,195 | 1,240 | 1,200 | 1,200 |
| 0.3°/°° | 1,750 | 1,580 | 1,660 | 1,600 | 1,610 |
| 0.5°/°° | 3,570 | 3,900 | 3,595 | | 3,370 |
| 5°/°° | 18,040 | 21,850 | 22,900 | | 22,400 |
| 50°/°° | 24,800 | 32,200 | 31,400 | | 32,400 |

The same tests, carried out under the same conditions, on the same type of soil sterilized with 10 ml. toluene, afforded similar results.

EXAMPLE 2

Six apparatus as described in Example 1 were connected to a suction pump. Into the upper chamber of each apparatus were introduced 50 g. of a soil whose chemical and physical-mechanical analysis data were equal to those reported in Example 1.

Into the lower chamber of the first apparatus, whose data will serve for purposes of comparison, were introduced 200 ml. of distilled water and 10 ml. of a solution of $NaH_2PO_4$ corresponding to 20 mg. of phosphorus.

Into the lower chambers of apparatus 2, 3, 4, 5 and 6 were introduced 200 ml. of an aqueous solution of tartronic acid in concentrations of 0.1 ‰, 0.2 ‰, 0.5 ‰, 5 ‰ and 50 ‰ respectively; and, furthermore, 10 ml. of the same solution of $NaH_2PO_4$. These quantities correspond, respectively, to 4, 8, and 20 quintals and 20 and 200 metric tons, respectively, of tartronic acid per metric ton of $P_2O_5$.

The test was conducted for 120 hours consecutively. Every 24 hours the circulation of the liquids was interrupted and from the lower chamber of each apparatus, a suitable liquid sample was withdrawn, the $PO_4^{---}$ ion content of which samples being established by conventional analytical methods.

The results of the test are schematically recorded on the following table, wherein the P content of the total circulating liquid is recorded as a function of time.

TABLE 2

| | 24 hours | 48 hours | 72 hours | 96 hours | 120 hours |
|---|---|---|---|---|---|
| Concentration used: | | | | | |
| 0 Blank | 380 | 190 | 100 | 100 | 100 |
| 0.1°/°° | 400 | 300 | 300 | 290 | 290 |
| 0.2°/°° | 1,210 | 1,190 | 1,200 | 1,200 | 1,150 |
| 0.5°/°° | 3,700 | 3,650 | 3,720 | 3,680 | 3,690 |
| 5°/°° | 23,600 | 23,600 | 22,300 | 21,200 | 20,700 |
| 50°/°° | 34,600 | 31,800 | 32,200 | 30,700 | 31,400 |

The same tests, carried out under the same conditions, on the same type of soil sterilized with 10 ml. toluene, afforded similar results.

EXAMPLE 3 (CLAYEY SOIL)

Into three apparatus as described in Example 1 were introduced 100 g. of a soil whose chemical and physical-mechanical analysis data were the following:

| | |
|---|---|
| pH | 5.9 |
| Organic substance ‰ (bichromate) | 19.4 |
| N ‰ (Kjeldahl) | 1.4 |
| Total $P_2O_5$ ‰ | 0.15 |
| $P_2O_5$ soluble in $H_2CO_3$ mg./kg. | 1.1 |
| Total $K_2O$ ‰ | 1.3 |
| Carbonates ‰ | Absent |
| Sand ‰ | 577 |
| Slime ‰ | 276 |
| Clay ‰ | 147 |

Into the first of the three apparatus was introduced 200 ml. of distilled water, into the second 200 ml. of an aqueous solution of methyltartronic acid at 0.5 ‰, into the third 200 ml. of a 1 ‰ solution of the same acid. To all three of these apparatus were added 10 ml. of a solution of $NaH_2PO_4$ equivalent to 20 mg. of phosphorus. In this way quantities of methyl tartronic acid were attained equivalent to 20 quintals per metric ton of $P_2O_5$ in the second apparatus and 40 quintals per metric ton of $P_2O_5$ in the third apparatus. The test was carried out according to the same procedure as described in Example No. 1 and the results obtained are recorded in the following table:

TABLE 3

| | 24 hours | 48 hours | 72 hours | 96 hours | 120 hours |
|---|---|---|---|---|---|
| Concentration used: | | | | | |
| 0 | 790 | 550 | 475 | 380 | 350 |
| 0.5°/°° | 3,280 | 2,830 | 2,840 | 2,630 | 2,540 |
| 1°/°° | 6,350 | 6,300 | 6,300 | 6,220 | 6,200 |

The same tests, carried out under the same conditions, on the same type of soil sterilized with 10 ml. of tulene, afforded similar results.

EXAMPLE 4 (CLAYEY SOIL)

Into three apparatus as described in Example 1 were introduced 100 g. of a soil whose chemical and physical-mechanical analysis data were equal to those recorded in Example 3.

Into the first of the three apparatus were introduced 200 ml. of distilled water, into the second 200 ml. of an aqueous solution of tartronic acid at 0.5 ‰, into the third 200 ml. of a solution at 1 ‰ of the same acid.

To all three apparatus were added 10 ml. of a solution of $NaH_2PO_4$, equivalent to 20 mg. of phosphorus. In this way quantities of tartronic acid, equivalent to 20 quintals per metric ton of $P_2O_5$ in the second apparatus and equivalent to 40 quintals per metric ton of $P_2O_5$ in the third apparatus, were attained.

The test was carried out according to the same procedure described in Example 1, and the results obtained are recorded in the following table:

TABLE 4

| | 24 hours | 48 hours | 72 hours | 96 hours | 120 hours |
|---|---|---|---|---|---|
| Concentration used: | | | | | |
| 0 | 790 | 550 | 480 | 380 | 350 |
| 0.5°/°° | 3,300 | 2,900 | 2,870 | 2,650 | 2,490 |
| 1°/°° | 6,700 | 6,420 | 6,430 | 6,190 | 6,250 |

The same tests, carried out under the same conditions, on the same type of soil sterilized with 10 ml. of toluene, afforded similar results.

EXAMPLE 5 (CALCAREOUS SOIL)

Into two apparatus as described in Example 1 were introduced 50 g. of a soil whose chemical and physical-mechanical data were the following:

| | |
|---|---|
| pH | 7.7 |
| Organic substance ‰ (bichromate) | 13.5 |
| N ‰ (Kjeldahl) | 0.7 |
| Total $P_2O_5$ ‰ | 1.0 |
| $P_2O_5$ soluble in $H_2CO_3$ mg./kg. | 0.5 |
| Total $K_2O$ ‰ | 1.5 |
| Carbonates ‰ | 141 |
| Sand ‰ | 735 |
| Slime ‰ | 234 |
| Clay ‰ | 31 |

Into the first of the two apparatus were introduced 200 ml. of distilled water, into the second 200 ml. of an aqueous solution of methyl tartronic acid at 0.3 ‰. To both these apparatus were added 10 ml. of a solution of $NaH_2PO_4$ equivalent to 20 mg. of phosphorus. In this way in the second apparatus a quantity of methyl tartronic acid was attained equivalent to 12 quintals per metric ton of $P_2O_5$. The test was carried out following the same procedure as described in Example 1 and the results obtained are recorded in the following table:

TABLE 5

| | 24 hours | 48 hours | 72 hours | 96 hours | 120 hours |
|---|---|---|---|---|---|
| Concentration used: | | | | | |
| 0 | 4,470 | 4,120 | 3,240 | 3,160 | 2,180 |
| 0.3°/°° | 7,400 | 6,800 | 6,740 | 6,560 | 6,360 |

The same test, carried out under the same conditions, on the same type of soil sterilized with 10 ml. of toluene, afforded similar results.

EXAMPLE 6 (CALCAREOUS SOIL)

Into two apparatus as described in Example 1 were introduced 50 g. of a soil whose chemical and physical-mechanical analysis data were equal to those reported in Example 5.

Into the first of the two apparatus were introduced 200 ml. of distilled water, into the second 200 ml. of an aqueous solution of tartronic acid at 0.3 ‰. To both of these apparatus were added 10 ml. of a solution of $NaH_2PO_4$ corresponding to 20 mg. of phosphorus.

In this way, in the second apparatus a quantity of tartronic acid equivalent to 12 quintals per metric ton of $P_2O_5$ was attained. The test was conducted according to the same procedure as described in Example 1, and the results attained are recorded in the following table:

TABLE 6

| | 24 hours | 48 hours | 72 hours | 96 hours | 120 hours |
|---|---|---|---|---|---|
| Concentration used: | | | | | |
| 0 | 4,470 | 4,120 | 3,240 | 3,160 | 2,180 |
| 0.3°/°° | 6,900 | 6,920 | 6,710 | 6,480 | 6,430 |

The same tests, conducted under the same conditions, on the same soil sterilized with 10 ml. of toluene, afforded similar results.

EXAMPLE 7

About 0.5 ha. (hectare i.e. 100 square meters) of a typically clayey soil was fertilized with 3 quintals of a common phosphate rock containing 18% $P_2O_5$.

Further 0.5 ha. of the same soil was manured with 1.5 ql. (quintals) of the same phosphate rock and with 20 kg. of methyl tartronic acid.

The soil was sown with grain-maize of medium vegetative cycle. The resultant crop was superior by 5% on the second plot manured with methyl tartronic acid and phosphate rock; from the same plot, a culture therefrom exhibited greater vegetative vigour, was greener and had wider surface leaves.

EXAMPLE 8

About 0.8 ha. of a clayey soil was manured with 3 ql. of a complex fertilizer 10–0–20 (10% $N_2$, 0% $P_2O_5$, 20% $K_2O$) and with 5 ql. of phosphate rock (18–20% $P_2O_5$).

Another plot of the same area and of the same type of soil, was manured with 3 ql. of the same complex fertilizer (10% $N_2$, 0% $P_2O_5$, 20% $K_2O$) with 2.5 ql. of phosphate rock (18–20% $P_2O_5$) and with 30 kg. of tartronic acid.

The soil was manured as permanent meadow.

The average of the crops harvested in the first and second year of cultivation was greater by 5% for the crop obtained on the plot manured with tartronic acid; furthermore, the hay had a better marketability than that obtained from the soil not manured with tartronic acid.

EXAMPLE 9

About 1 ha. of an acid alluvial soil scarcely provided with organic substance was manured with 3 ql. of a complex fertilizer 10–0–20 (10% $N_2$, 0% $P_2O_5$, 20% $K_2O$) and with 4 ql. of phosphate rock (18–20% $P_2O_5$).

Another plot of equal area and of similar soil was manured with 3 ql. of the same binary fertilizer 10% $N_2$, 0% $P_2O_5$, 20% $K_2O$, with 2 ql. of the phosphate rock and with 30 kg. of methyl tartronic acid.

The crop of cultivated legumes (beans) was about equal in both cases, but in the case of the plot manured with methyl tartronic acid the seeds were greater in size, of better quality, with greater germinating power and better edibility characteristics.

EXAMPLE 10

About 0.4 ha. of an alluvial plot was manured with 2.5 ql. of a phosphate rock (18–20% $P_2O_5$).

Further 0.4 ha. of the same soil was manured with 1.0 ql. of phosphate rock (18–20% $P_2O_5$) and with 20 kg. of tartronic acid. The soil was sown with winter wheat (San Pastore variety).

The crop turned out to be superior by about 10% on the second plot manured with tartronic acid and phosphate rock.

The action of these substances must be attributed, most probably, to the complexing power exerted by them with respect to the iron, aluminium and calcium ions present in the soil, and which are responsible for the formation of insoluble phosphates.

What is claimed is:

1. A process for improving the assimilation of phosphorus by plants, comprising impregnating a soil containing a plant nutrient soluble phosphate with an additive selected from the group consisting of tartronic acid and a 2-lower alkyl tartronic acid to inhibit metal ions in the soil rendering said soluble phosphates insoluble, the quantity of additive ranging from between about 4 quintals to about 200 metric tons per metric ton of phosphorous expressed as $P_2O_5$.

2. The process of claim 1, wherein the soil is treated with tartronic acid.

3. The process of claim 1, wherein the soil is treated with methyltartronic acid.

4. The process of claim 1, wherein the soil is simultaneously treated with the phosphate and additive.

5. The process of claim 1, wherein the soil is treated with the additive subsequent to its treatment with said phosphate.

6. The process of claim 1, wherein the quantity of additive ranges from between about 4 quintals to about 4 metric tons per metric ton of phosphorus expressed as $P_2O_5$.

(References on following page)

References Cited

UNITED STATES PATENTS

| | | | |
|---|---|---|---|
| 3,131,048 | 4/1964 | Balassa | 71—1 |
| 3,150,160 | 9/1964 | Dexter | 71—1 XR |
| 3,183,073 | 5/1965 | Preston | 71—1 |

FOREIGN PATENTS 584,959  10/1959  Canada.

OTHER REFERENCES

Hackh's Chemical Dictionary, 3rd edition, 1944, page 832, The Blakiston Co., Philadelphia.

S. LEON BASHORE, Primary Examiner

B. H. LEVENSON, Assistant Examiner

U.S. Cl. X.R.

71—33